UNITED STATES PATENT OFFICE.

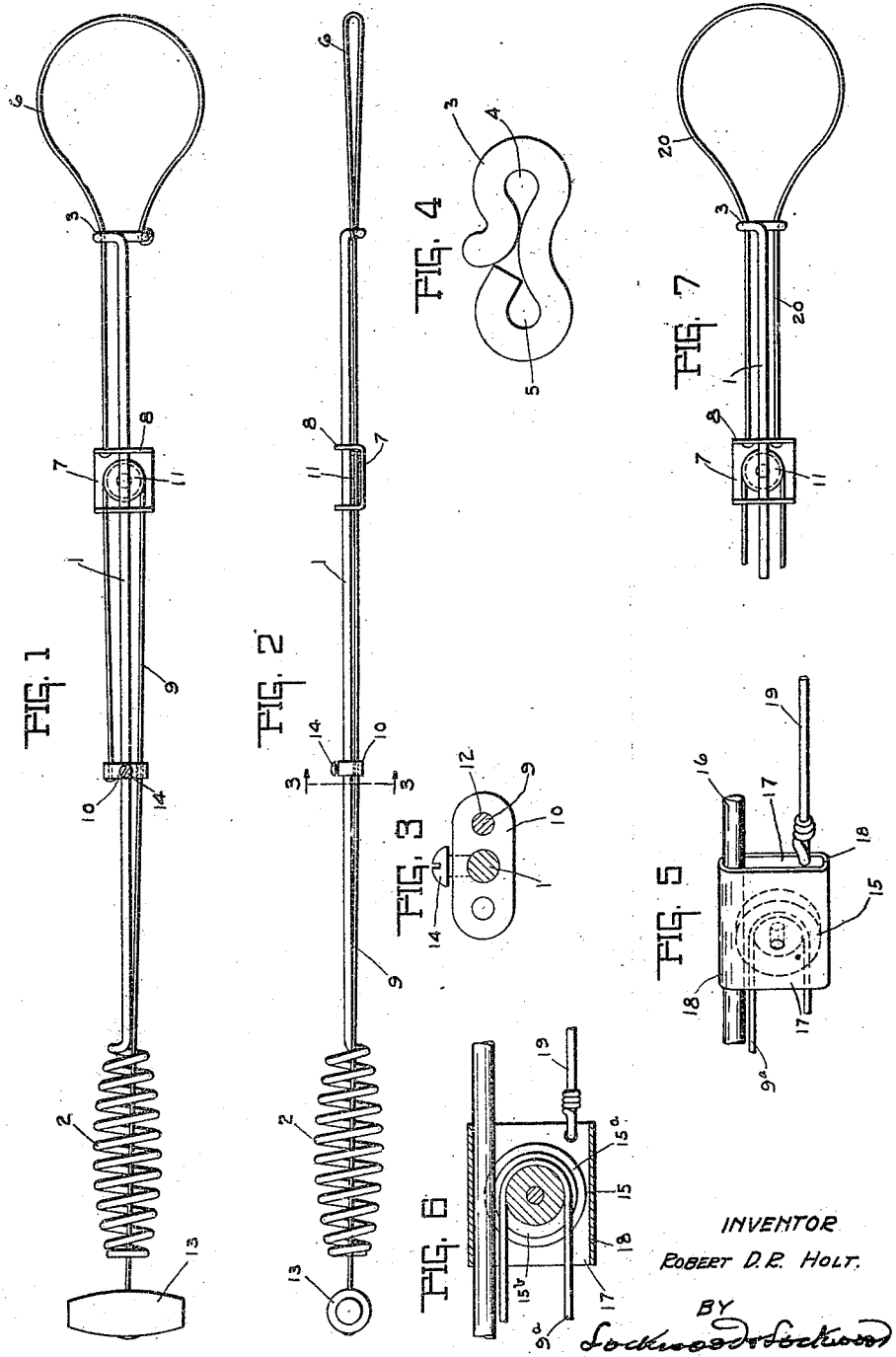

ROBERT D. R. HOLT, OF RUSHVILLE, INDIANA.

ANIMAL-CATCHER.

1,297,468.  Specification of Letters Patent.  Patented Mar. 18, 1919.

Application filed June 20, 1918. Serial No. 240,959.

*To all whom it may concern:*

Be it known that I, ROBERT D. R. HOLT, a citizen of the United States, and a resident of Rushville, county of Rush, and State of Indiana, have invented a certain new and useful Animal-Catcher; and I do hereby declare that the following is a full, clear, and exact description thereof, reference being had to the accompanying drawings, in which like numerals refer to like parts.

This invention relates to means for catching and holding animals, and is designed primarily for holding hogs while rings are being introduced into their nose. The prime feature of the invention is the provision of a staff having a loop at one end thereof and means for contracting the loops so as to bind the same around parts of an animal.

A further feature of the invention is the provision of adjustable means whereby a greater or less pull will be required to bring the loop into proper formation to engage the parts of the animal, and a further feature of the invention is the provision of means for controlling the operation of the loop and holding the same in engagement with the animal with a minimum amount of exertion on the part of the operator.

The full nature of the invention will be understood from the accompanying drawings and the following description and claims.

In the drawings, Figure 1 is a top plan view of the device. Fig. 2 is an edge elevation thereof. Fig. 3 is an enlarged sectional view as seen on line 3—3 of Fig. 2. Fig. 4 is an enlarged end elevation of the staff employed in connection with the catching device. Fig. 5 is a detail perspective view of a modified form of sheave carrying frame. Fig. 6 is a longitudinal central sectional view of Fig. 5, and Fig. 7 is a top plan view showing a modified means of attaching the loop to the sheave carrying frame.

Referring to the drawings in which similar reference numerals designate corresponding parts throughout the several views, 1 indicates a staff which is preferably constructed of wire or rod, one end of the staff being coiled to form a hollow handle section 2, while the opposite end thereof is bent to form a transversely disposed head 3, the parts thereof being so bent as to form eyes 4 and 5. Preferably attached to the eye 5 is a loop forming wire 6, the opposite end of the wire being extended through the eye 4, and engaged with a frame 7 sliadbly mounted upon the staff 1, said frame being substantially U-shaped, the staff projecting through openings in the vertically extending sections 8 of the frame, the end of the loop wire 6 being likewise attached to one of the sections 8.

The loop formed by the wire 6 is adapted to extend around parts of the animal, preferably the snout of a hog, and be drawn into engagement therewith so as to securely hold the animal while rings are being placed in its snout, and to more readily accomplish this result, means is provided for moving the frame 7 longitudinally of the staff 1, so as to contract the size of the loop of the wire 6. This is accomplished by attaching one end of the cable 9 to a cross head 10 carried by the staff 1, said cable extending through openings in one of the vertical sections 8, and around a sheave 11, pivotally mounted upon the base of the frame 7, and extending thence through an additional opening in the section 8 through an opening 12 in the opposite end of the cross head 10, and through the coiled handle section 2, the free end of the cable being provided with any suitable form of pull knob 13. By providing a sheave around which the cable extends a minimum amount of exertion is required to hold the loop forming wire in firm engagement with the part of the animal engaged thereby.

The cross head 10 is adjustably mounted upon the staff 1 by means of a set screw 14, so that the size of the loop formed by the wire 6 may be regulated for use in connection with animals of different sizes, and thereby requiring substantially the same length of pull upon the cable in order to engage the loop with large or small animals.

In Fig. 5 of the drawing the sheave 15 is shown suspended at one side of the staff 16, the frame 17 carrying the sheave 15 being in the form of a loop 18 which fits around the staff 16 and slides thereon. The end of the loop forming wire 19 is attached to the frame in any suitable manner. The sheave 15 has an enlarged channel 15$^a$ which engages the staff 16, causing the sheave to ride thereon which tends to lessen and practically prevent frictional contact between the staff and frame 17, said sheave also having a smaller channel 15$^b$ through which the cable 9$^a$ travels, thus permitting the cable to pass between the sheave and staff without contacting with the staff.

As shown in Fig. 7 of the drawing, if preferred, the loop forming wire 20 may have both of its ends attached to the frame 7 in which instance the ends of the loop forming wire slide through the eyes 4 and 5.

The invention claimed is:—

1. In an animal catching device, the combination with a staff having a transversely disposed head at one end, said head having eyes formed by bending parts of the head, of a loop forming wire, one end of which is attached to one of said eyes, and the opposite end extended through the opposite eye, a frame slidable longitudinally of said staff to which the opposite end of the wire is attached, a sheave rotatably mounted on said frame, a flexible cable passing around said sheave for moving said frame longitudinally of the staff to contract the loop formed by said wire, and a cross head to which one end of said cable is attached.

2. An animal catching device, comprising a staff, a loop forming wire coöperating with the staff, a frame slidable on said staff to which the loop forming wire is attached, a sheave on said frame, a cable coöperating with said sheave to move the same longitudinally on the staff, a cross head to which one end of the cable is anchored, and means to adjust the cross head on the staff whereby the size of the loop formed by said wire may be determined.

3. An animal catching device, comprising a staff, a frame slidable on said staff, a loop forming wire attached at one end to said frame and at its opposite end to the staff, a sheave carried by said frame, said sheave having an enlarged channel for engagement with said staff, a cable passing around said sheave between the staff and sheave, and a cross head to which one end of said cable is attached.

4. In an animal catching device, the combination with a staff and a wire forming loop carried thereby, of a frame slidable on said staff to which one end of said loop forming wire is attached, a sheave carried by the frame having an enlarged groove and a smaller groove surrounding the same, said staff entering said larger groove, a cable surrounding said sheave and entering the smaller groove for moving said frame lengthwise of the staff for regulating the loop formed by said wire, and a cross head to which one end of said cable is attached.

In witness whereof, I have hereunto affixed my signature.

ROBERT D. R. HOLT.